United States Patent
Lind (10) Patent No.: US 12,030,059 B2
(45) Date of Patent: Jul. 9, 2024

(54) FOOD PROCESSING DEVICE AND A METHOD OF PROCESSING FOOD

(71) Applicant: MAREL SALMON A/S, Stovring (DK)

(72) Inventor: Christian Brochner Lind, Klarup (DK)

(73) Assignee: MAREL SALMON A/S, Stovring (DK)

(\*) Notice: Subject to any disclaimer, the term of this patent is extended or adjusted under 35 U.S.C. 154(b) by 271 days.

(21) Appl. No.: 17/414,433

(22) PCT Filed: Dec. 20, 2019

(86) PCT No.: PCT/EP2019/086684
§ 371 (c)(1),
(2) Date: Jun. 16, 2021

(87) PCT Pub. No.: WO2020/127976
PCT Pub. Date: Jun. 25, 2020

(65) Prior Publication Data
US 2022/0088611 A1 Mar. 24, 2022

(30) Foreign Application Priority Data
Dec. 21, 2018 (EP) ..................................... 18215575

(51) Int. Cl.
*B02C 18/22* (2006.01)
*A22C 17/00* (2006.01)
(Continued)

(52) U.S. Cl.
CPC ...... *B02C 18/2216* (2013.01); *A22C 17/0026* (2013.01); *A23L 13/60* (2016.08); *B02C 18/305* (2013.01)

(58) Field of Classification Search
CPC ..................... B02C 18/2216; A22C 17/0026
See application file for complete search history.

(56) References Cited

U.S. PATENT DOCUMENTS 3,190,210 A \* 6/1965 McComb ................ B30B 11/24
99/323.4
3,624,830 A \* 11/1971 Stehower ............... A23N 17/00
425/313
(Continued)

FOREIGN PATENT DOCUMENTS

JP S5588680 U 6/1980
JP 2014236723 A 12/2014
(Continued)

OTHER PUBLICATIONS

Japanese Office Action from corresponding JP Application No. 2021-535557, dated Jul. 14, 2023.
(Continued)

*Primary Examiner* — Sean M Michalski
(74) *Attorney, Agent, or Firm* — Workman Nydegger (57) ABSTRACT

A food processing device includes a feeding structure arranged for the transport of food objects downstream from an inlet to an outflow of a flow path. The feeding structure has a first feeder with a transport auger arranged upstream a knife, and a second feeder arranged downstream a knife, a knife configured to cut the food objects in the flow path to provide a substance of sliced lumps. The flow path defines an unhindered passage between the knife and the outflow to facilitate a free flow of the substance of sliced lumps away from the knife. An inspection unit is configured to detect undesired objects in the substance of sliced lumps. The food object could be meat, fruit, or vegetables. The processing device provides an unhindered flow of the sliced lumps away from the knife, facilitating an easier inspection and removal of undesired objects from the lumps.

10 Claims, 8 Drawing Sheets

(51) Int. Cl.
*A23L 13/60* (2016.01)
*B02C 18/30* (2006.01)

(56) References Cited

U.S. PATENT DOCUMENTS

| | | | | |
|---|---|---|---|---|
| 3,680,994 | A * | 8/1972 | Longenecker | A21C 11/20 |
| | | | | 425/188 |
| 4,422,582 | A * | 12/1983 | Roeger | B02C 18/36 |
| | | | | 241/82.5 |
| 4,966,542 | A * | 10/1990 | Kobayashi | A21C 11/163 |
| | | | | 425/308 |
| 4,978,077 | A * | 12/1990 | Huebner | B02C 18/36 |
| | | | | 241/30 |
| 5,493,957 | A * | 2/1996 | Kennedy | B65B 25/007 |
| | | | | 53/232 |
| 5,558,896 | A * | 9/1996 | Kobayashi | A23P 30/25 |
| | | | | 426/503 |
| 7,374,579 | B2 * | 5/2008 | Larson | A23P 30/20 |
| | | | | 83/198 |
| 11,014,257 | B2 | 5/2021 | Sunter et al. | |
| 11,633,743 | B2 * | 4/2023 | Lesar | B02C 18/301 |
| | | | | 241/79 |
| 2003/0228387 | A1 * | 12/2003 | Hunter | A21C 11/10 |
| | | | | 425/311 |
| 2006/0081135 | A1 * | 4/2006 | Britton | A21B 7/00 |
| | | | | 99/486 |
| 2009/0311390 | A1 * | 12/2009 | Phelps | A23K 50/48 |
| | | | | 426/392 |
| 2012/0286077 | A1 | 11/2012 | York | |
| 2014/0170947 | A1 * | 6/2014 | Sigurosson | A22C 17/008 |
| | | | | 452/184 |
| 2015/0209978 | A1 * | 7/2015 | Snyder | B33Y 40/00 |
| | | | | 425/162 |
| 2017/0151686 | A1 | 6/2017 | Sunter et al. | |

FOREIGN PATENT DOCUMENTS

| | | |
|---|---|---|
| JP | 2017526340 A | 9/2017 |
| WO | 2014091006 A1 | 6/2014 |
| WO | 2015198062 A1 | 12/2015 |
| WO | 2016045683 A1 | 3/2016 |

OTHER PUBLICATIONS

Search Report and Written Opinion from corresponding European Application No. 18215575.4, dated Apr. 24, 2019.
International Search Report and Written Opinion from PCT Application No. PCT/EP2019/086684, dated Apr. 22, 2020.

* cited by examiner

FOOD PROCESSING DEVICE AND A METHOD OF PROCESSING FOOD

FIELD OF THE INVENTION

The present disclosure relates to a food processing device comprising a feeding structure arranged to feed food objects in a downstream direction from an inlet to an outlet of a flow path, a knife configured to cut the food object in the flow path to provide a substance of sliced lumps, and an inspection unit configured to detect undesired objects in the substance of sliced lumps.

BACKGROUND OF THE INVENTION

Food grinders such as meat grinders are frequently used in processing plants for chopping or mincing meat and similar food objects.

In traditional meat grinders, the meat is transported by a feeder to a cutting appliance. The cutting appliance is often constituted by one of more rotating knives arranged directly against a metal plate with a plurality of small holes, referred to as a hole-plate.

In food grinders, the meat is added to a chute or hopper, and a feeder feeds the meat to the knife. The feeder provides a continuous pressure towards the hole-plate. Due to the rotation of the knife directly against the hole-plate, the meat is finely minced while it is conveyed through the holes of the hole-plate. This provides a smooth and fine meat product with a homogenous character. Sometimes, the hole-plate is exchangeable such that the mincing quality can be varied by use of different hole-plates with different hole sizes. The knife rotates directly against the surface of the hole-plate.

While the combination between a rotating knife and a hole-plate ensures a fine mincing of the meat, undesired objects, e.g. fragments of bone or gristle, are fragmented into very small pieces.

Since detection of the fragmented objects is difficult and the removal of the fragmented objects are even more difficult, producers usually removes undesired objects before the meat is grinded. Removal of undesired objects at this stage often includes removal of large meat parts to be handled by abattoir workers to cut away meat with the undesired objects. In total, the amount of discarded meat is high to secure no undesired objects in the following processing steps. A problem with human handling of the meat to remove undesired objects is that not all undesired objects are removed. Furthermore, human handling of the meat increases the risk of contaminating the meat with e.g. bacteria.

DESCRIPTION OF THE INVENTION

It is an object of embodiments of this disclosure to improve food grinding, particularly with respect to reducing the amount of after treatment, and the amount of undesired objects in the food object. It is a further object to facilitate an alternative processing of food objects, particularly with respect to removal of undesired objects.

According to these and other objects, the present disclosure provides a food processing device and a method for processing food.

The food processing device comprises a feeding structure arranged for transport of food objects in a direction from an inlet to an outflow of a flow path. A knife is configured to cut the food objects in the flow path to provide a substance of sliced lumps, and the flow path defines an unhindered passage between the knife blades and the outflow to facilitate a free flow of the substance of sliced lumps away from the knife.

In an embodiment the food processing device comprises a feeding structure arranged for transport of food objects in a downstream direction from an inlet to an outflow of a flow path, the feeding structure comprising, a first feeder comprising a transport auger arranged upstream a knife, and a second feeder arranged downstream a knife, a knife with at least one knife blade configured to cut the food objects in the flow path to provide a substance of sliced lumps, wherein the flow path defines an unhindered passage between the knife and the outflow to facilitate a free flow of the substance of sliced lumps away from the knife, an inspection unit located downstream the knife and configured to detect undesired objects in the substance of sliced lumps.

Herein, the term "unhindered passage" means that there is no hole-plate or similar flow restricting obstacles between the rotating knife and the outflow.

Due to the unhindered passage, the undesired objects are not defragmented to the extent known from existing machines operating with a hole-plate. Since the meat is sliced by a knife without hindering passage of the substance of sliced lumps away from the knife, the food object is cut into pieces which are large relative to the pieces obtained with a knife and hole-plate combination.

Accordingly, detection and removal of undesired objects can be carried out efficiently in the substance of sliced lumps. Compared with the alternative of removing the undesired objects before the food object is sliced, the method according to the present disclosure is easier and more efficient since the sliced lumps provide easier access to the undesired objects. Compared with the alternative of removing the undesired objects from a substance of minced food resulting from a traditional method using a knife and hole-plate combination, the method according to the present disclosure is easier and more efficient since the undesired objects are not minced completely into a large amount of small fragments by the knife and hole-plate combination.

Since the knife is not directly against a hole-plate, the traditionally experienced wear on the hole-plate and knife can be avoided and the risk of metal fragments in the substance of sliced lumps is reduced.

Further, the processing speed can be increased compared to the speed which can be achieved in a device which operates with a knife and hole-plate combination. This is inter alia due to the increased pressure against the surface of the hole-plate which restricts the processing speed.

Accordingly, the disclosed system and method potentially improve the quality of the food, increases the processing speed, and reduces wear and thereby increase lifetime of the equipment and reduces maintenance costs.

In the following, the disclosure will be explained with reference to a device for processing meat. The undesired objects in meat could be bone and gristle and foreign objects. Meat is only taken as an example and processing, e.g. of vegetable, fruit and similar food objects are also within this disclosure.

The device may particularly be a meat grinder or pre-grinder, and particularly a powered grinder or pre-grinder for industrial purpose, i.e. configured for very high throughput and made of high tensile steel or similar strong and durable materials.

The device may particularly be configured for assembly and disassembly, particularly such that the device forms a grinding train of components which facilitate the grinding and which are arranged one after the other in the flow passage. The components forming the grinding train in the flow passage could particularly be assembled e.g. in a tool-free manner, by pushing one component into engagement with an adjacent component.

The flow passage may form an open end into which each component of the grinding train is pushed, either one by one for assembly inside the flow passage, or preassembled into one grinding train which is inserted into the flow passage. Subsequently, the flow passage could be closed by a lock-nut attached at the open end to prevent the grinding train from moving out of the flow passage.

The knife may be configured for rotation in the flow path, and it may comprise one or more knife blades, such as two or three knife blades, extending radially from a hub.

The device may further comprise an inspection unit configured to detect undesired objects in the substance of sliced lumps. In this embodiment, the feeding structure may be arranged for transport of the sliced lumps in a flow path extension from the outflow to an outlet of the device.

The inspection unit may be arranged between the knife blades and the outlet, and the flow path extension may define an unhindered passage between the outflow and the inspection unit to facilitate a free flow of the substance of sliced lumps to the inspection unit whereby the substance of sliced lumps are received by the inspection unit directly from the knife blades in the form obtained by the cutting with the knife. The substance of sliced lumps may also be formed into a stream of sliced food lumps after the outflow and upstream of the inspection unit. This stream of sliced food lumps may pass the inspection unit for inspection.

The knife may be fixed between a downstream structure located downstream of the knife and an upstream structure located upstream of the knife.

The downstream structure may be ring shaped and form a tunnel for the substance of sliced meat lumps which can move though the hollow centre of the ring shaped structure.

The downstream structure may provide an easy way of assembling and disassembling the grinder or pre-grinder, and due to the hollow centre, the flow path provides unhindered passage compared to the traditional knife and hole-plate combination.

The downstream structure may be arranged circumferentially about the knife and it may have a larger dimension than the knife in the axial direction. In an alternative embodiment, the downstream structure is arranged in axial continuation of the knife in the downstream direction. In that case, it may form a ring shaped contact surface against the knife, i.e. a surface which is in contact with the knife. This contact may particularly be along a tip portion of the knife blades.

In one embodiment, the downstream structure moves with the knife. In one example, the knife is rotatable and the downstream structure is joined to rotate with the knife.

In an alternative embodiment, only the knife moves. In case of the latter, the knife moves relative to the mentioned ring shaped contact surface and this may cause wear on the points of contact between the knife and the contact surface. Accordingly, the downstream structure and/or the knife may comprise a friction reducing surface and/or a wear resisting surface at the points of contact. This may be provided as a coating layer of a hard and/or low frictional material.

The feeding structure may comprise a first feeder arranged upstream the knife, and a second feeder arranged downstream the knife. Herein, downstream the knife is between the knife and the outflow or between the knife and the outlet when an inspection unit is included in the device.

The first feeder could be a transport auger, and the second feeder could be a conveyor, such as a conveyor belt, arranged to convey the substance of sliced lumps through the inspection unit.

The device may further comprise a nozzle, which may be located at the outflow such as being connected to the tunnel at a downstream position of the tunnel at the outflow position. The nozzle may be configured to restrict the flow path volume such that the sliced food lumps is formed into a strand of sliced food lumps. The strand of sliced food lumps may be further directed in the downstream position by a conveyor belt passing it past the inspection unit.

An upstream part of the device may be a hopper located before the first feeder and being configured for holding an amount of food objects and deliver these food objects to the first feeder.

A grinder may be arranged downstream the inspection unit. The grinder may be configured to grind the substance of sliced meat lumps into a substance of minced meat. The grinder may be between the inspection unit and the outlet.

The device may further comprise a separation structure configured for removing meat lumps with undesired objects, and it may comprise an inject structure configured to inject meat which is separated from the removed meat lumps into the flow path downstream the inspection unit or upstream the inspection unit to perform a further inspection of the meat lumps.

The device may comprise a pre-grinder knife or a pre-cutter arranged in the flow passage upstream the knife, e.g. between the feeder and the knife. The pre-grinder knife facilitates a pre-processing of the food object where larger food lumps are cut into smaller lumps before reaching the knife where the larger lumps are sliced into the substance of sliced lumps.

The pre-grinder, when provided, may be arranged at a distance from the knife such that the knife and pre-grinder does not move against each other. That reduces wear on the knife and pre-grinder.

The aforementioned upstream structure could be constituted by the pre-grinder or by a distance ring located between the pre-grinder and the knife. The upstream structure may particularly be located between the pre-grinder knife and the knife such that it separates the pre-grinder and the knife. I one embodiment, the upstream structure has a ring shape with an open centre through which the pre-grinded meat can move. The upstream structure may be in contact with at least one of the pre-grinder knife and the knife, e.g. a tip portion of the rotating blades mentioned previously. The upstream structure may be formed in one piece with the pre-grinder knife such that the pre-grinder knife has a circumferential portion with a larger dimension in the axial direction than the remaining parts of the pre-grinder.

As mentioned previously, the knife may include an integral circumferential rim. This rim may have a larger dimension in the axial direction than the blades of the knife. This corresponds essentially to the integration of a distance ring formed in one piece with the knife. Such an integrated distance ring has the advantage that assembly, disassembly, cleaning, and maintenance may become less complicated by the reduced number of elements in the meat grinder.

In a second aspect, the disclosure provides a method of processing meat, the method comprising feeding meat in an downstream direction across a rotating knife to provide a substance of sliced meat lumps, inspecting substance of sliced meat lumps to detect undesired objects, removing detected undesired objects, and optionally grinding the substance of sliced meat lumps to provide a substance of minced meat.

Removing detected undesired objects may comprise removing a portion of the sliced food lumps including the detected undesired objects.

The method may comprise the step of separating meat from the removed objects and grinding the separated meat.

The method may comprise any of the steps implicit from the device according to the first aspect of the disclosure.

The food objects to be process may be meat, such as meat parts of a weight below e.g. 4 kg.

BRIEF DESCRIPTION OF THE DRAWINGS

Embodiments of the invention will now be further described with reference to the drawings, in which.

DETAILED DESCRIPTION OF EMBODIMENTS

It should be understood that the detailed description and specific examples, while indicating embodiments of the invention, are given by way of illustration only, since various changes and modifications within the spirit and scope of the invention will become apparent to those skilled in the art from this detailed description.

The device of this disclosure could be for processing any kind of food object. Particularly, however, it may be advantageous for processing food objects in which unwanted objects could be found. That includes inter alia vegetable or fruit which may contain unwanted seeds etc. It may include meat which could contain unwanted bone or gristle, it may be any kind of food which are to be processed into sliced lumps or eventually minced.

In the following, a meat grinder 1 preferably configured for high volume processing of meat in a meat processing plant is described as an example of such a device for processing food objects.

Figures 1, 2:
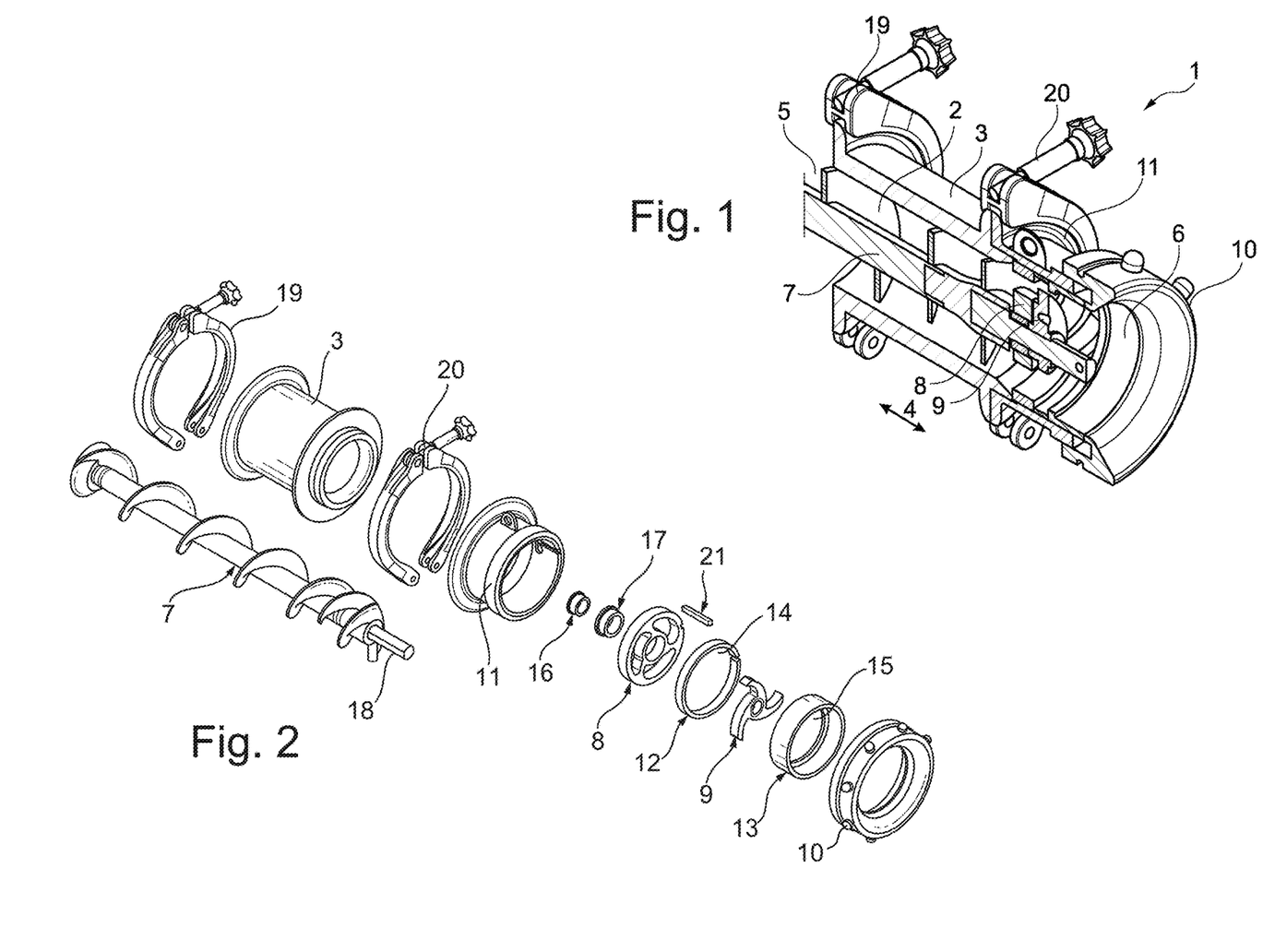
FIG. 1 illustrates a perspective view of a meat grinder in a cross-section along the axial direction.
FIG. 2 illustrates an exploded view of the meat grinder.
Figure 3:
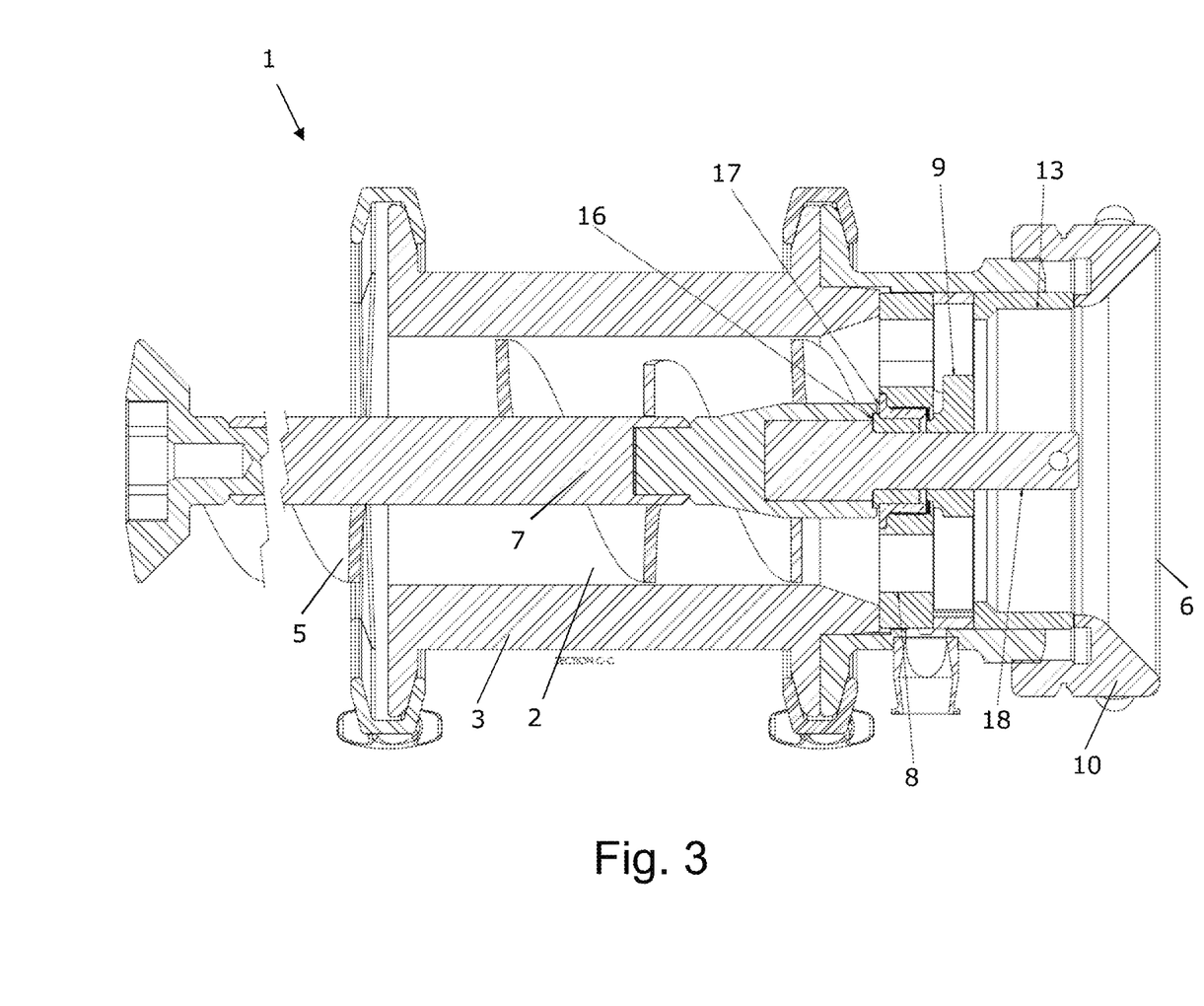
FIG. 3 illustrates a cross section, side view.

FIG. 1 illustrates a perspective, cross sectional view, FIG. 2 illustrates an exploded view, and FIG. 3 illustrates a cross section, side view. In the figures the same numbers apply for the same features of the meat grinder.

The meat grinder comprises a flow passage 2 formed by the casing 3 which extends in an axial direction, as indicated by the arrow 4. The casing extends from an inlet 5 where lumps of meat enter the meat grinder, to an outflow 6, where the grinded meat is ejected from the grinder.

A screw feeder 7 is arranged in the flow passage and feeds meat in the axial direction through the passage. The screw feeder is driven by an electrical motor which is not illustrated in the drawings.

The screw feeder drives a pre-grinder 8 and a knife 9, herein, we refer to the screw feeder, pre-grinder, and knife as the "grinder train". The grinder train is fixed in the flow passage by the lock nut 10 which is attached by screw threads to the casing 3 via the flange 11. The flange allows adaptation of different length of grinder trains.

The grinder train includes two distance rings 12, 13 forming upstream and downstream structures. A first of the two distance rings 12, the upstream structure, is arranged between the pre-grinder and the knife and provides a clearance on the upstream side of the knife towards the feeder. A second of the two distance rings 13, the downstream structure, is arranged between the knife and the lock nut 10 and provides a clearance on the downstream side of the knife towards the outflow. Each of the two distance rings forms an internal flow passages 14, 15 for flow of meat though the distance ring.

The meat grinder further includes a D-Nut 16 and a bearing 17 configured for carrying and rotationally driving the pre-grinder and knife at the end of the screw feeder by engagement with the screw feeder tip 18. The meat grinder further includes coupling rings 19, 20 which, at the inlet, connects the meat grinder to a power and meat supply, and which in the opposite end connects the flange 9 to the casing.

The spline 21 prevents rotation of the first distance ring 12 and the pre-grinder 8 by engagement with grooves in the first distance ring 12, the pre-grinder 8 and the flange 11.

Figure 4:
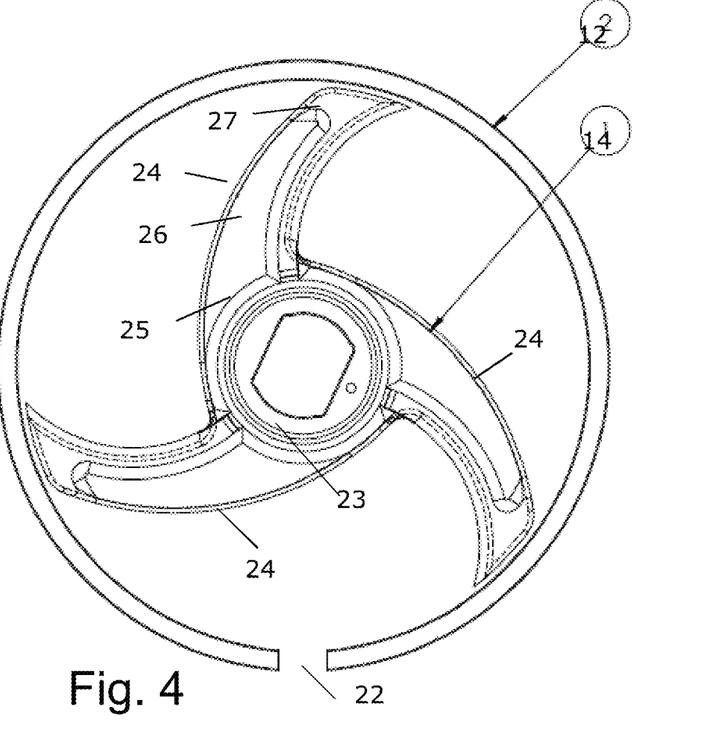
FIG. 4 illustrates a knife set for the flow passage.

FIG. 4 illustrates a knife set for the flow passage. The knife set comprises the knife 9 and the distance ring 12.

In this view, the notch 22 for engagement with the spline 21 is clearly shown. The notch and spline engagement prevents rotation of the distance ring.

The knife comprises a hub 23 and three blades 24. The hub is configured for rotation about a rotation axis and each blade extending radially from an attachment portion 25 of the blades, i.e. where the blade is attached to the hub via central portion 26 to a tip portion 27 which terminates the blade radially outwardly.

Figure 5:
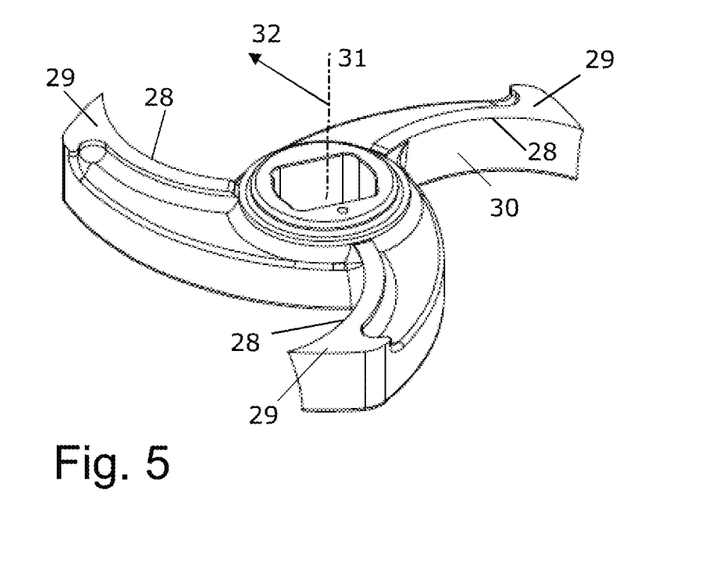
FIG. 5 illustrates the knife in a perspective view.

As illustrated in FIG. 5, each blade forms a cutting edge 28 extending between an axial surface 29 and a tangential surface 30. The axial surface 29 faces in the direction of the rotation axis and the tangential surface faces in a direction which is perpendicular to the axial direction and the radial direction. The rotation axis is indicated by the dotted line 31, and the radial direction is indicated by the arrow 32.

Figure 6:
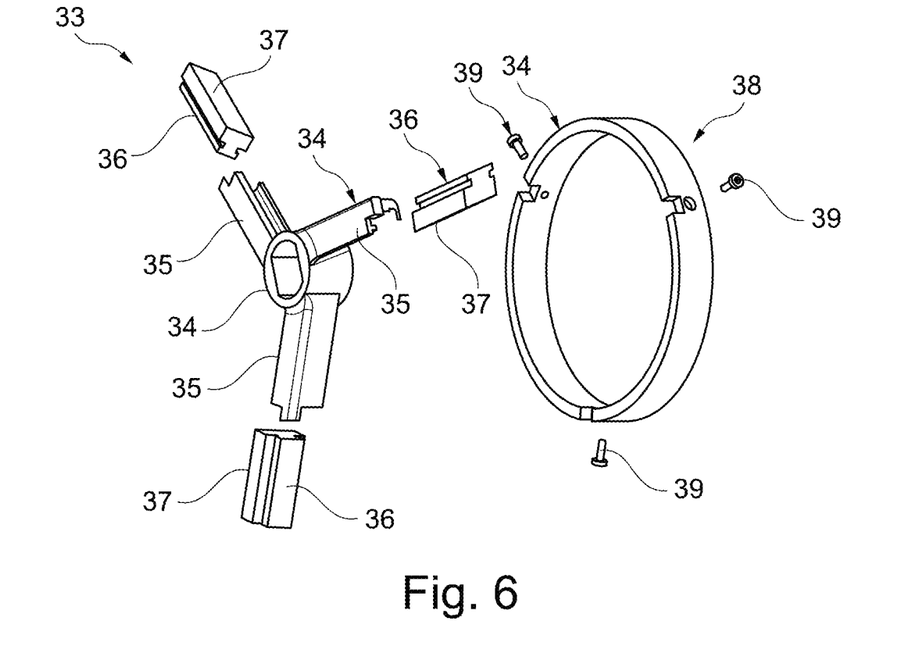
FIGS. 6 and 7 illustrate an alternative embodiment of the knife.
Figure 7:
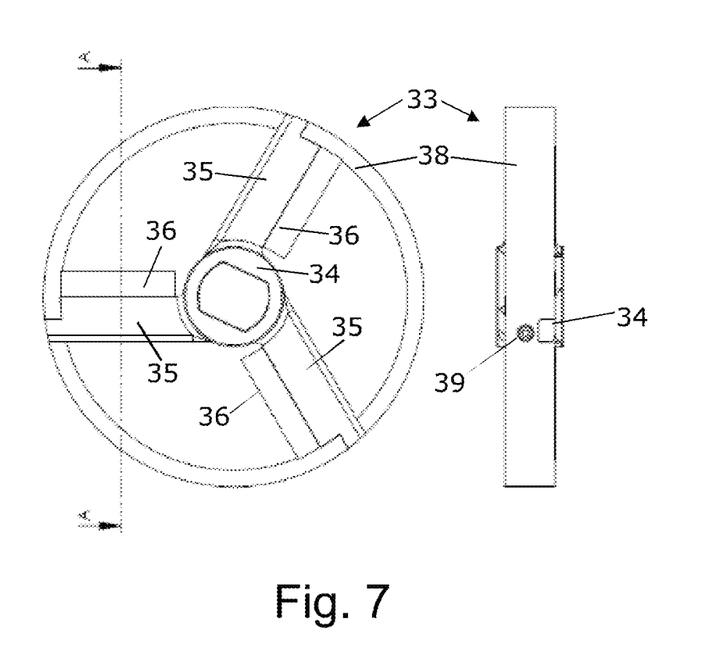

FIGS. 6 and 7 illustrate an alternative embodiment of the knife. In this embodiment, the knife 33 comprises a hub 34 with integrate blades 35 extending radially from the hub. Each blade has a mounting fixture for attachment of separate cutting elements 36. Each cutting element forms a cutting edge. 37. The distance ring 38 is fixed to the blades by the rivets 39 and rotates with the knife. Accordingly, the distance ring becomes integrated in the knife and rotates in contact with those elements being adjacent to the knife. The distance ring could be made from a low friction material, e.g. brass. When mounting the separate cutting elements 36, these are mounted in the fixture of the integrate blades 35, such that the separate cutting elements 36 slide into the fixture and along the integrate blades 35 leaving the ends of the integrate blades 25 outermost part or the knife system.

Figure 8:
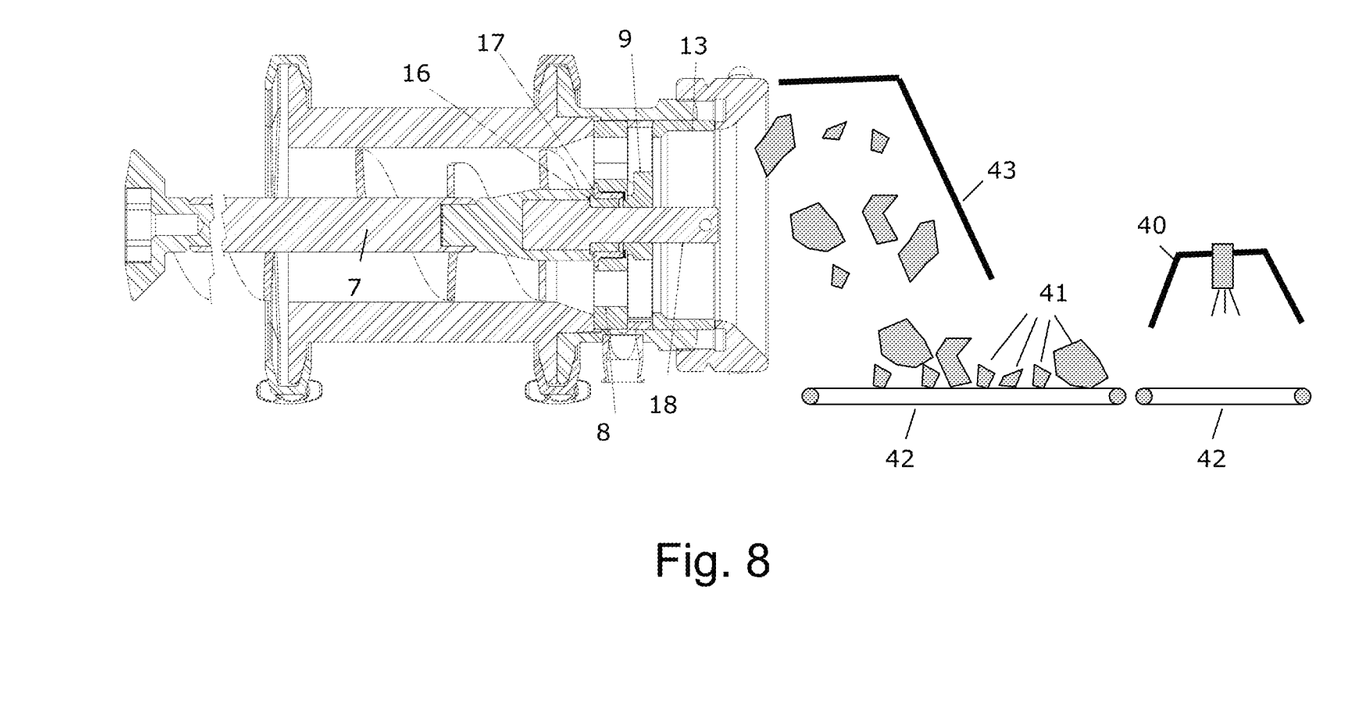
FIG. 8 illustrates a device comprising an inspection unit.

FIG. 8 illustrates a cross section of a food processing device comprising an inspection unit 40. The inspection unit is arranged downstream the knife and the device comprises a flow path extension which defines an unhindered passage between the outflow and the inspection unit.

The substance of sliced lumps 41 are ejected from the outflow and received in the inspection unit where undesired objects are detected by X-ray or similar techniques known in the art.

The sliced lumps are received in the sizes they have obtained when leaving the knife. Since the meat is sliced by a knife with no hindrance after the knife, the lumps are relatively large when compared with the mincing which is obtained with a traditional knife and hole-plate combination.

The feeding structure comprises a first feeder arranged upstream the knife. The first feeder is a transport auger 7, which presses the meat through the knife 9. Downstream the knife 9, the feeding structure comprises a second feeder in the form of a conveyor 42 arranged to convey the substance of sliced lumps 41 through the inspection unit 40. Even though the meat is transported by different structures and even though it is diverted by the screen 43, the meat is allowed through the flow path to flow unhindered and there is no hole-plate after the knife 9.

Figure 9:
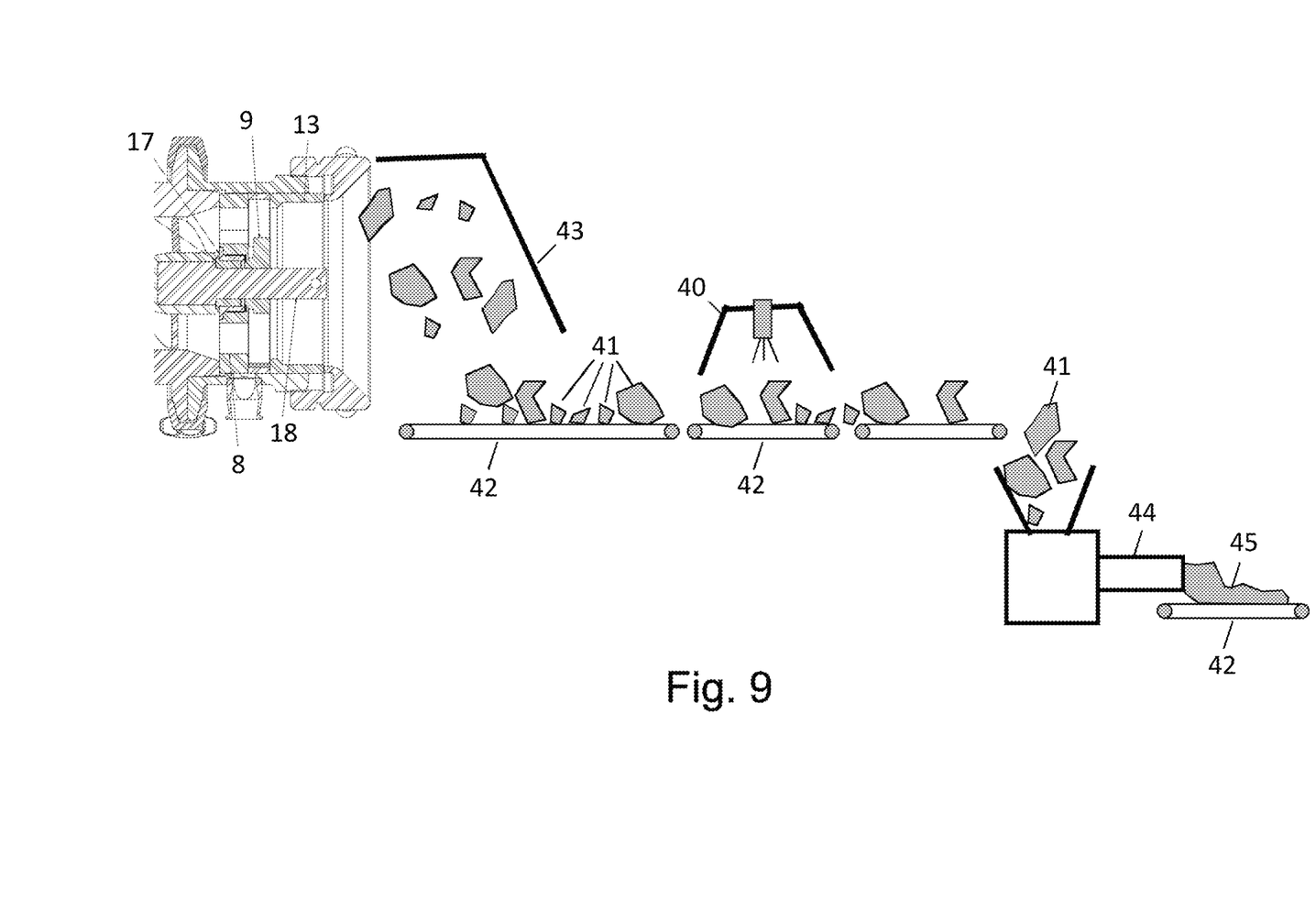
FIG. 9 illustrates a device comprising an inspection unit and a grinder.

FIG. 9 illustrates a device which further comprises a grinder 44 arranged downstream the inspection unit 40 and which is configured to grind the substance of sliced meat lumps 41 into a substance of minced meat 45. The mincing of the sliced meat lumps 41 takes place after the inspection in the inspection unit 40 and undesired objects are therefore removed before the mincing.

Figure 10:
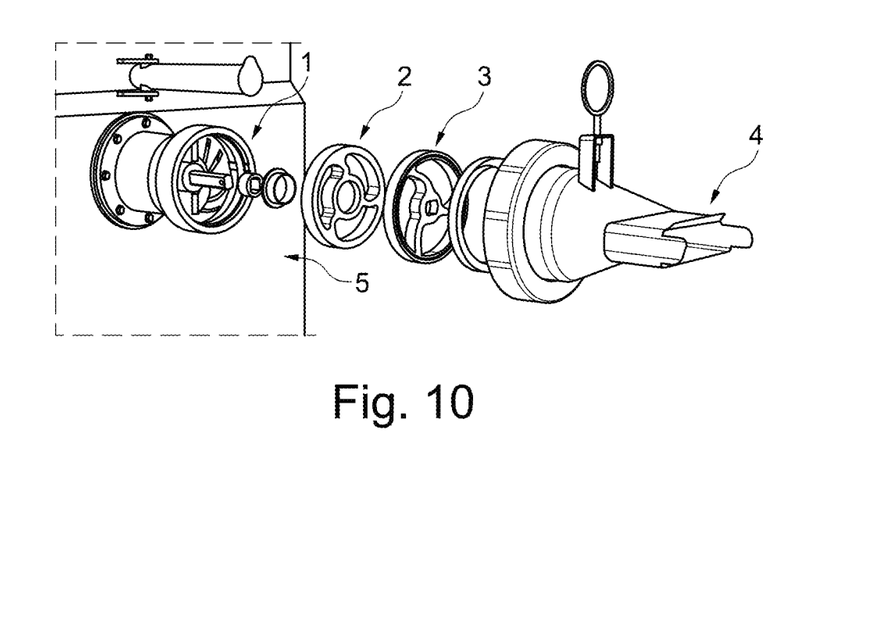
FIG. 10 illustrates a part of a device with the first feeder, knife and a nozzle.

FIG. 10 illustrates part of the processing device with a tube 46 configured for holding a transport auger, a pre-cutter 8, a knife 9 and a nozzle 47. The arrow 48 illustrates the flow direction of the food objects. The pre-cutter 8 and the knife 9 are to be located inside the tube 46, and the nozzle 47 is located as the last part of the first feeder. The pre-cutter 8 divides the food product into smaller pieces, which afterwards are cut further by the knife 9. Here the knife 9 is illustrated as a ring knife with three knife blades. The nozzle 47 can form the sliced food lumps such as into a stream of sliced food lumps. Such a stream of sliced food lumps may have a height and a width of e.g. about 60 mm high and 250 mm, respectively. The nozzle may deliver the stream of sliced food lumps to the second feeder (see e.g. FIG. 11) conveying the stream of sliced food lumps towards the inspection unit (see e.g. FIG. 11). The pre-cutter 8 need not be part of the device. The nozzle 47 need not be part of the device, or can be constructed differently than indicated, making another form and/or dimension of the stream of sliced food lumps.

Figure 11:
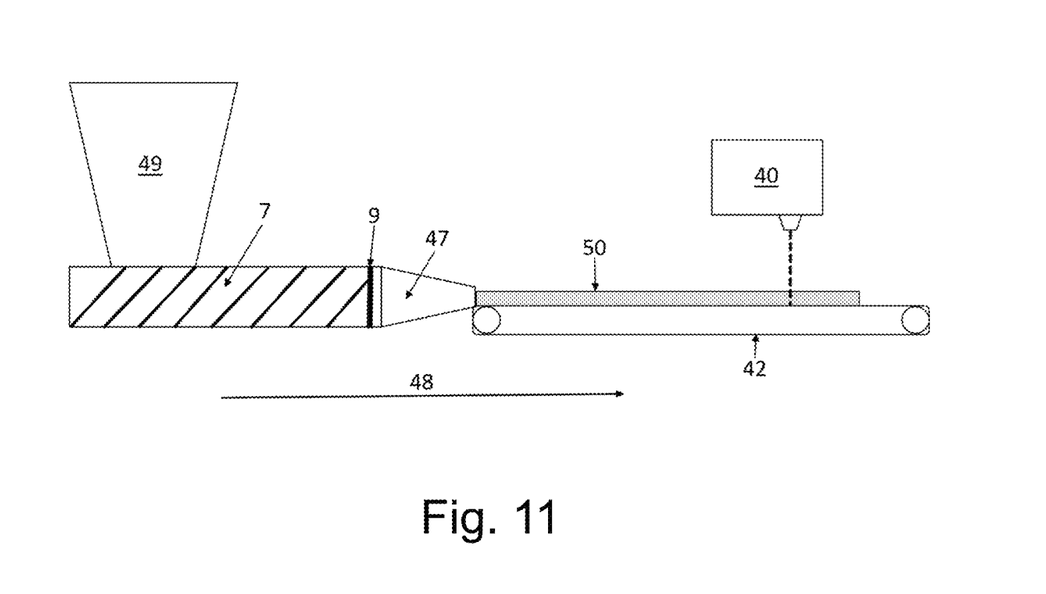
FIG. 11 illustrates a device comprising an inspection unit.

FIG. 11 illustrates an embodiment of the device comprising a hopper 49 into which food objects, such as meat parts, are filled. The hopper 49 functions as a buffer for the food objects. The food objects are delivered from the hopper 49 to the first feeder 7, here indicated to be a transport auger, which directs the food objects towards the knife 9 where the food objects are sliced into food lumps, and further directed through a nozzle 47, which shapes the food lumps into a stream of sliced food lumps 50. The stream of sliced food lumps 50 is transported by a second feeder 42, here illustrated as a transport belt, which transport the stream of sliced food lumps 50 past an inspection unit 40 to detect undesired objects in the stream of sliced food lumps 50. The arrow 48 indicates the flow direction of the food in the device. A similar device may be used with sliced food lumps not made into a stream of sliced food lumps.

Figure 12:
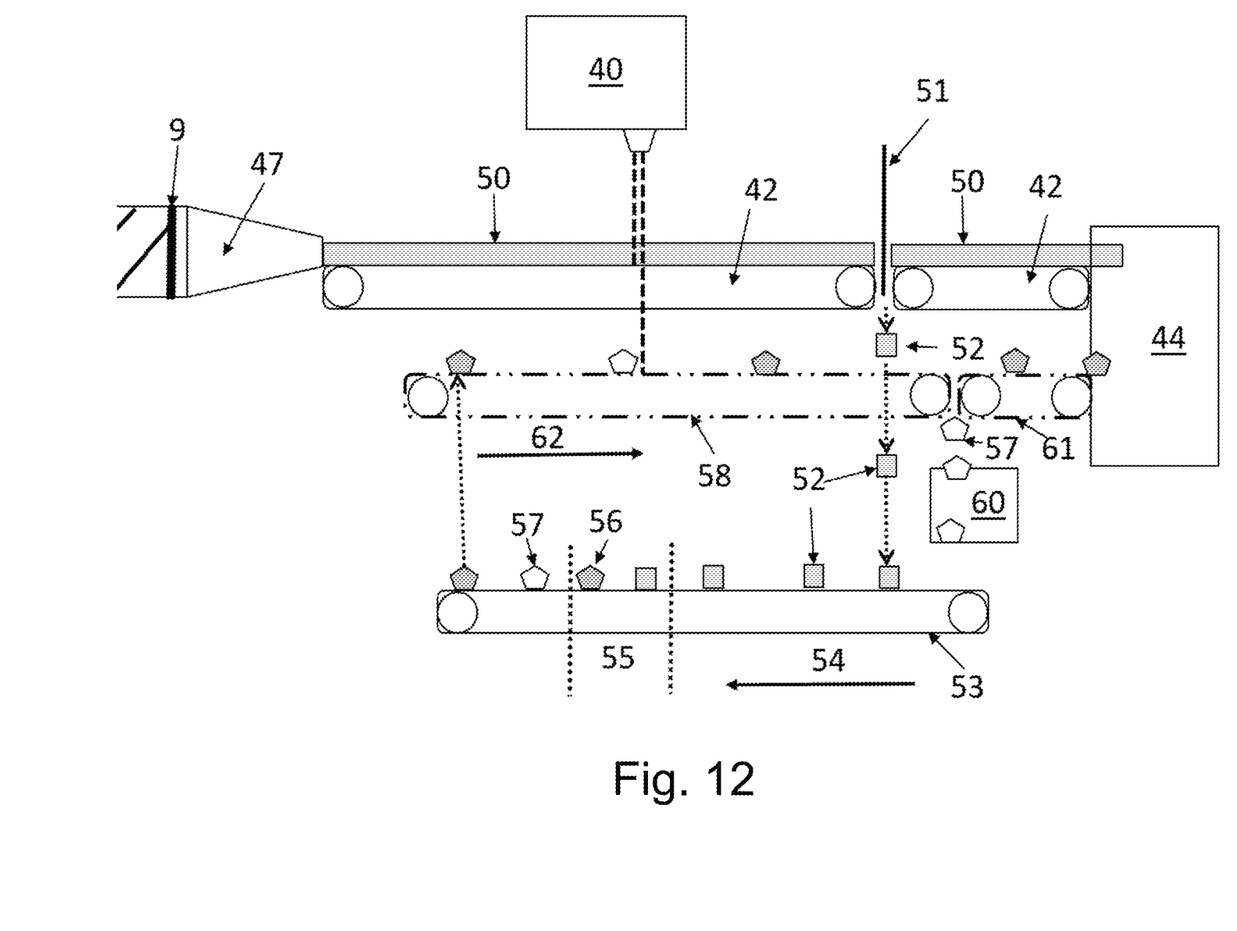
FIG. 12 illustrates a device comprising an inspection unit, a separation structure and an inject structure.

FIG. 12 illustrates the part of the embodiment of FIG. 11 and in addition a separation structure configured to remove undesired object from the stream of sliced food lumps 50 and an inject structure configured to return the stream of sliced food lumps 50 without undesired objects into the flow path downstream the inspection unit such as directing the meat to a grinder 44. When an undesired object is detected in the stream of sliced food lumps 50 by the inspection unit 40, a knife 51, such as a slicer knife with e.g. a curved slicer blade, cuts the stream of sliced food lumps 50 in an area of the stream where the inspection unit 40 has detected an undesired object. The knife 51 cuts before and after the detected undesired object in the stream of sliced food lumps 50 resulting in cut outs 52 of the stream of sliced food. The cuts made by the knife 51 may be performed through a passage made between two feeders 42, such as between two conveyor belts transporting the stream of sliced food lumps 50. The cut outs 52 of the stream of sliced food can fall through the passage between the two feeders 42, and may reach another conveyor belt 53 or into a box (not shown). The cut outs 52 may be transported in an upstream direction as indicated by arrow 54, and may be handled further in a handling area 55 such that cut outs 52, which each may have a weight of e.g. 30-400 gram, are turned into smaller sized food objects 56 and hereby into smaller sized food objects without undesired objects 56 and smaller sized food objects with undesired objects 57. The smaller sized food objects 56, 57 are directed to a further conveyor e.g. a conveyor belt 58, which may be a conveyor belt located next to the conveyor belt 42 directing the stream of sliced food lumps 50 past the inspection unit 40. The conveyor belt 62 are running in the downstream direction as indicated by the arrow 62. The smaller sized food objects 56, 57 are inspected by the inspection unit 40, and the smaller sized food objects without undesired objects 56 are injected into the flow path downstream the inspection unit 40, such as directed to a grinder 44, and the smaller sized food object with undesired objects 57 are discarded e.g. into a box 60 e.g. by performing a temporary opening between the conveyor belt 58 and the conveyor belt 61. In the figure it is illustrated by the dotted arrows that the cut outs 52 are directed from the cutting area of the knife 51 to the conveyor belt 53. The conveyor belt 58 is illustrated with a dashed line to illustrate it is not shown in the correct level according to the second feeder 42 passing the inspection unit 40. Preferably the conveyor belt 58 and the second feeder 42 located under the inspection unit 40 are at same level. A similar device may be used with sliced food lumps not made into a stream of sliced food lumps.

Embodiments

1. A food processing device (1) comprising a feeding structure (7, 42) arranged for transport of food objects in a downstream direction from an inlet to an outflow of a flow path, a knife (9) configured to cut the food objects in the flow path to provide a substance of sliced lumps (41), wherein the flow path defines an unhindered passage between the knife blades and the outflow to facilitate a free flow of the substance of sliced lumps away from the knife.

2. The food processing device according to embodiment 1, further comprising an inspection unit (40) configured to detect undesired objects in the substance of sliced lumps.

3. The food processing device according to embodiment 2, wherein the feeding structure is arranged for transport of the sliced lumps in a flow path extension from the outflow to an outlet, and wherein the inspection unit is arranged between the knife blades and the outlet.

4. The food processing device according to embodiment 3, wherein the flow path extension defines an unhindered passage between the outflow and the inspection unit to facilitate a free flow of the substance of sliced lumps to the inspection unit whereby the substance of sliced lumps are received by the inspection unit directly from the knife blades in the form obtained by the cutting with the rotating knife blades.

5. The device according to any of the preceding embodiments, wherein the knife is fixed between a downstream structure located downstream of the knife and an upstream structure located upstream of the knife, the downstream structure forming a ring shaped contact surface against the knife and forming a tunnel for the substance of sliced lumps.

6. The device according to any of the preceding embodiments, wherein the feeding structure comprises a first feeder (7) arranged upstream the knife, and a second feeder (42) arranged downstream the knife.

7. The device according to embodiment 6, wherein the first feeder is a transport auger.

8. The device according to embodiment 2 and 6 or according to embodiment 2 and 7, wherein the second feeder is a conveyor arranged to convey the substance of sliced lumps through the inspection unit.

9. The device according to any of embodiments 2-8, further comprising a grinder arranged downstream the inspection unit and configured to grind the substance of sliced meat lumps into a substance of minced meat.

10. The device according to any of the preceding embodiments, further comprising a separation structure configured for removing lumps with undesired objects.

11. The device according to embodiment 10, comprising an inject structure configured to inject meat which is separated from the removed lumps into the flow path downstream the inspection unit.

12. The device according to any of the preceding embodiments, further comprising a pre-grinder knife arranged upstream the knife.

13. A food slicing device comprising a feeding structure arranged to transport food objects in an upstream direction from an inlet to an outflow of a flow path, a knife configured to cut the food objects in the flow path to provide a substance of sliced lumps, wherein the flow path defines an unhindered passage between the knife blades and the outflow to facilitate a free flow of the substance of sliced lumps away from the knife.

14. A method of processing meat, the method comprising feeding meat in an upstream direction across a rotating knife to provide a substance of sliced meat lumps, inspecting substance of sliced meat lumps to detect undesired objects, removing detected undesired objects, and grinding the substance of sliced meat lumps to provide a substance of minced meat.

15. The method of embodiment 14, separating meat from the removed objects and grinding the separated meat.

The invention claimed is:

1. A food processing device comprising:
   a feeding structure arranged for transport of food objects in a downstream direction from an inlet to an outflow of a flow path, the feeding structure comprising:
   i) a first feeder comprising a transport auger arranged upstream a knife, and
   ii) a second feeder arranged downstream a knife;
   a knife with at least one knife blade configured to cut the food objects in the flow path to provide a substance of sliced lumps; and
   an inspection unit located downstream the knife and configured to detect undesired objects in the substance of sliced lumps;
   wherein the flow path defines an unhindered passage between the knife and the outflow to facilitate a free flow of the substance of sliced lumps away from the knife, the unhindered passage being devoid of hole-plate or flow restricting obstacles between the knife and the outflow;
   wherein the knife is fixed between a downstream structure located downstream of the knife and an upstream structure located upstream of the knife, the downstream structure forming a ring-shaped contact surface against the knife and forming a tunnel for the substance of sliced lumps.

2. The food processing device according to claim 1, wherein the feeding structure is arranged for transport of the sliced lumps in a flow path extension from the outflow to an outlet, and
   wherein the inspection unit is arranged between the knife blades and the outlet.

3. The food processing device according to claim 2, wherein the flow path extension defines an unhindered passage between the outflow and the inspection unit to facilitate a free flow of the substance of sliced lumps to the inspection unit whereby the substance of sliced lumps are received by the inspection unit from the knife in a sliced form obtained by the cutting with rotating knife blades.

4. The device according to claim 1, wherein the second feeder is a conveyor arranged to convey the substance of sliced lumps through the inspection unit.

5. The device according to claim 1, wherein a nozzle is connected to the tunnel at a downstream position of the tunnel at the outflow position,
   wherein the nozzle restricts the flow path volume such that the sliced food lumps is formed into a strand of sliced food lumps.

6. The device according to claim 1, wherein a hopper is located before the first feeder for holding and delivering food objects to the first feeder.

7. The device according to claim 1, further comprising a grinder arranged downstream the inspection unit and configured to grind the substance of sliced lumps into a substance of minced food.

8. The device according to claim 1, further comprising a separation structure configured for removing sliced lumps with undesired objects.

9. The device according to claim 8, further comprising an inject structure configured to inject sliced food which is separated from the removed lumps into the flow path downstream the inspection unit.

10. The device according to claim 1, further comprising a pre-cutter arranged upstream the knife for pre-cutting the food objects in the flow path.

* * * * *